United States Patent
Gopalakrishnan et al.

(10) Patent No.: US 9,681,013 B2
(45) Date of Patent: Jun. 13, 2017

(54) METHODS AND SYSTEMS FACILITATING GENERATION OF DIGITAL REPRESENTATIONS OF OBJECTS

(71) Applicant: XEROX CORPORATION, Norwalk, CT (US)

(72) Inventors: Sainarayanan Gopalakrishnan, Chennai (IN); Sudhagar Subbaian, Coimbatore (IN); Dhevendra Alagan Palanivel, Chennai (IN); Anand Arokia Raj Antony Muthu Rayar, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/886,158

(22) Filed: Oct. 19, 2015

(65) Prior Publication Data
US 2017/0111530 A1    Apr. 20, 2017

(51) Int. Cl.
*H04N 1/04*    (2006.01)
*H04N 1/00*    (2006.01)

(52) U.S. Cl.
CPC ....... *H04N 1/00708* (2013.01); *H04N 1/0044* (2013.01); *H04N 1/00411* (2013.01); *H04N 1/04* (2013.01); *H04N 2201/0094* (2013.01)

(58) Field of Classification Search
CPC ................................................ H04N 1/00708
See application file for complete search history.

(56) References Cited

U.S. PATENT DOCUMENTS

| | | | | |
|---|---|---|---|---|
| 6,229,630 B1* | 5/2001 | Kim | ................... | H04N 1/00681 358/444 |
| 6,426,760 B1* | 7/2002 | Takahashi | ............ | H04N 1/0035 711/200 |
| 2002/0063869 A1* | 5/2002 | Matsumura | .......... | H04N 1/3875 358/1.2 |
| 2003/0191743 A1* | 10/2003 | Brodersen | ......... | G06F 17/30174 |
| 2005/0050146 A1* | 3/2005 | Jani | ........................ | G06Q 10/10 709/206 |

* cited by examiner

*Primary Examiner* — Ibrahim Siddo
(74) *Attorney, Agent, or Firm* — Philip E. Blair; Fleit Gibbons Gutman Bongini & Bianco P.L.

(57) ABSTRACT

Disclosed herein is a system, method and computer implemented method of facilitating generation of a digital representation of one or more physical objects. The method may include scanning a first part of the one or more physical objects to obtain image data corresponding to the first part. The scanning may be performed based on a first set of values corresponding to one or more parameters. The image data corresponding to the first part may be a digital representation of the first part. The method may further include determining a size of image data corresponding to the first part. Additionally, the method may include displaying information based on the size of the image data corresponding to the first part, prior to receiving image data corresponding to a second part of the one or more physical objects.

38 Claims, 6 Drawing Sheets

METHODS AND SYSTEMS FACILITATING GENERATION OF DIGITAL REPRESENTATIONS OF OBJECTS

The disclosure herein generally relates to the field of digital technology. More specifically, the disclosure relates to facilitating generation of digital representations of physical objects.

BACKGROUND

Creating a digital representation of a physical object can be useful in various situations. Such a digital representation may be considered as an electronic copy of the physical object. The electronic copy affords several advantages such as, but not limited to, ease of storage, processing, sharing and creation of physical copies. For instance, a scanned copy of a physical document, such as a legal contract, may easily be shared between users who may be spread across the globe. Further, the scanned copy may also enable creation of a corresponding physical copy by using, for example, an electronic printer. Moreover, the scanned copy may be processed automatically by a computer. As a result, human burden of performing tasks involving analysis of the physical document may be reduced by a great extent.

In order to create digital representations of physical objects, devices called scanners are commonly used. Scanners usually include sensors for sensing at least one property of an area of interest in the physical object. The sensed information can then be converted from analogue to digital form. For example, in one type of a scanner, optical radiation is used for sensing optical properties such as, but not limited to, reflectance at different portions of a physical document. Accordingly, digital representation of the reflectance at different portions of the physical document is generated and stored for further use.

A scanner typically allows users to control the process of scanning based on a set of parameters. The set of parameters generally determine a quality of digital representation corresponding to the physical object. For example, an optical scanner may allow users to set values corresponding to parameters such as, but not limited to, spatial resolution, color depth, encoding format and output file type. Further, depending on the values corresponding to the set of parameters, a size of the digital representation may vary for a given physical object. The size of the digital representation represents the amount of storage space required to store the digital representation. For example, a higher value of resolution may generate a digital representation that is greater in size due to an increase in amount of information generated by the scanner. In another example, multiple physical objects may be scanned and converted into a single digital file that contains representations of each physical object. Generally, a greater number of physical objects scanned and combined into the single digital file results in a greater file size. Additionally, various types of data compression applied to the digital representation of the physical object can affect the size of the digital representation.

The effect of values corresponding to the set of parameters of the scanner on the size of digital representation is generally not evident to users. Further, for a fixed set of values corresponding to the set of parameters, the size of the digital representation may also vary depending on characteristics of the physical object. Thus, users are usually unaware of the size of an output file containing the digital representation before and during scanning of the physical object. Currently, information about the size of an output digital file is available to users only after scanning processes have been completed. Accordingly, if users desire a different set of values corresponding to the set of parameters, such as a smaller output file size, users are forced to repeat the scanning event using adjusted scanning parameters, based on knowledge of the size of the initial output file that resulted from the initial scanning parameters. This results in indefinitely long time durations to perform scanning operations of physical objects in a desired manner and causes inconvenience to users.

SUMMARY

Disclosed herein is a system, method, and computer implemented method of facilitating generation of a digital representation of one or more physical objects. The method may include receiving, with a processor, image data corresponding to at least a first part of the one or more physical objects. The image data corresponding to the first part may be obtained by scanning the first part of the one or more physical objects. Further, the scanning may be performed based on a first set of values corresponding to one or more parameters. The image data corresponding to the first part may be a digital representation of the first part. The method may further include determining a size of image data corresponding to the first part. The size may represent an amount of storage space required to store the image data corresponding to the first part. Additionally, the method may include displaying, on a graphical user interface, information based on the size of the image data corresponding to the first part, prior to receiving image data corresponding to a second part of the one or more physical objects.

Disclosed herein is a system for facilitating generation of a digital representation of one or more physical objects. The system may include a scanner configured for scanning at least a first part of the one or more physical objects to obtain image data corresponding to the first part. The scanning may be performed based on a first set of values corresponding to one or more parameters. The image data corresponding to the first part may be a digital representation of the first part. The system may further include a processor configured for determining a size of image data corresponding to the first part. The size may represent an amount of storage space required to store the image data corresponding to the first part. Additionally, the system may include a display unit configured for displaying information based on the size of the image data corresponding to the first part, prior to receiving image data corresponding to a second part of the one or more physical objects. Further, the display unit may be communicatively coupled to the processor.

DETAILED DESCRIPTION

Figure 1:
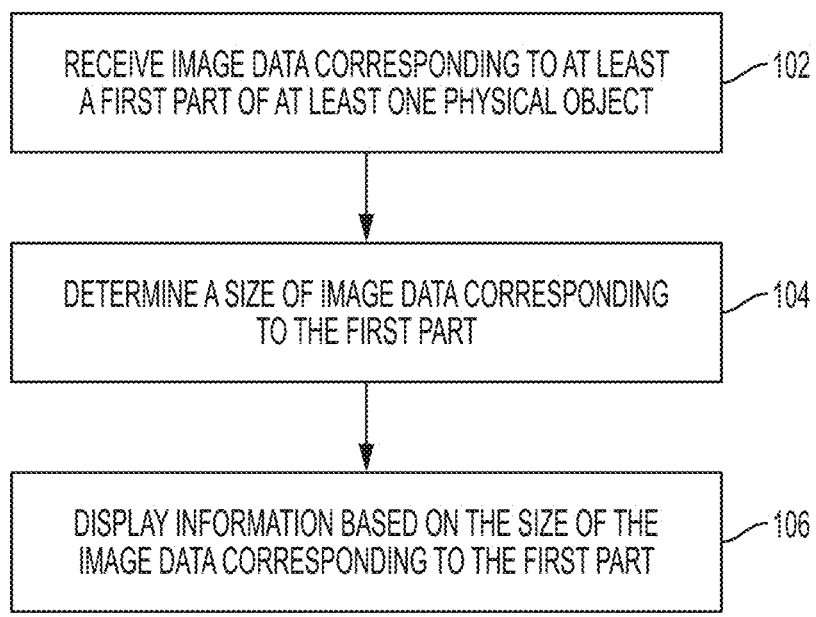
FIG. 1 is a flowchart depicting a method of facilitating generation of digital representation of one or more physical objects in accordance with a disclosed embodiment.

Overview:

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

The disclosure generally relates to methods and systems for facilitating scanning operations ("scanning") of one or more physical objects. Scanning operations may be performed for creating a digital representation of the one or more physical objects. For example, the one or more physical objects may be physical documents, such as pages of a book, and there may be a need to create an electronic copy of the physical documents. Accordingly, a scanner, such as, but not limited to, an optical scanner may be used to generate the digital representation in the form of image data. The embodiments, however, are intended to include or otherwise cover other types of scanning devices and operations including linear imagers, 3D digitizers, laser scanners, 2D image readers, LIDAR, digital cameras, etc. The exemplary optical scanner may be controlled by a set of values corresponding to one or more parameters such as, but not limited to, spatial resolution, temporal resolution, spectral resolution, color depth, encoding format, compression type and file type. Based on the set of values, a first part of the one or more physical objects may be scanned to obtain image data corresponding to the first part. For example, the first part may comprise a predetermined number of pages of the book being scanned. Subsequently, a size of image data corresponding to the first part may be determined. The size represents an amount of storage space required to store the image data corresponding to the first part. Thereafter, information based on the size of the image data corresponding to the first part may be displayed. The information may be displayed prior to receiving image data corresponding to a second part of the one or more physical objects. For example, the information based on size of the image data corresponding to the first 10 pages may be displayed while the remaining pages of the book are yet to be scanned. As a result, a computer processor may estimate a calculation of a total size of the digital representation of the one or more physical objects before the one or more physical objects are completely scanned and display the estimated total size to the user via a graphical user interface. Accordingly, the user may desire to change one or more values of the set of values corresponding to the parameters of the optical scanner. For example, during scanning, if the computer processor calculates that the total size of the digital representation may exceed a predetermined limit, the user may change one or more values corresponding to the parameters to ensure that the total size of the digital representation is lower than or equal to the predetermined limit. For instance, the user may reduce the value corresponding to spatial resolution. The predetermined limit may be, for example, a maximum size limit of an email attachment allowed by an email function of the optical scanner. In another example, if the computer processor calculates that the total size of the digital representation may be lower than the predetermined limit, the user may change one or more values corresponding to the parameters to ensure that a higher quality of the digital representation is achieved. Thus, displaying information based on the size of the image data corresponding to the first part enables the user to obtain a digital representation of the one or more physical objects that may satisfy one or more criteria related to, but not limited to, a quality of the digital representation and a total size of the digital representation.

DEFINITIONS

Physical object: A physical object is a real world object made up of physical matter. The physical object may be for example, one or more of a substantially two dimensional object such as a sheet of paper and a three dimensional object such as a metallic object. The physical object may be one or more of a naturally occurring object, a man-made object and a combination of naturally occurring object and man-made object. Examples of the naturally occurring object include, but are not limited to, metal, wood, clay, stone and living beings. Examples of man-made object include, but are not limited to, paper, books, fabric, plastic, alloys, semiconductor based devices and machines.

Digital representation: Digital representation refers to information expressed in the form of digits such as, for example, binary digits. For instance, a digital representation of a physical object may represent a characteristic such as shape of the physical object.

Characteristic of a physical object: A characteristic of a physical object refers to a property of the physical object. The characteristic may be one or more of a physical characteristic, a chemical characteristic and a functional characteristic. For example, the physical characteristic may be reflectance of light in different regions of a surface of the physical object.

Optical characteristic: An optical characteristic of a physical object refers to a property of the physical object in relation to its interaction with optical radiation. Examples of the optical characteristic may include optical reflectance, optical transmittance, radiance and luminance.

Optical reflectance: Optical reflectance refers to a proportion of optical radiation incident on a region of a physical object that is reflected back.

Optical transmittance: Optical transmittance refers to a degree to which incident optical radiation is transmitted through a physical object. It may be determined by the ratio of the light energy falling on a physical body to that transmitted through the physical object.

Radiance: Radiance refers to the flux of radiation emitted per unit solid angle in a given direction by a unit area of a physical object.

Luminance: Luminance refers to the intensity of light emitted from a physical object per unit area in a given direction.

Image data: Image data refers to a digital representation of a characteristic of a physical object. For example, image data may be digital information, such as bits, representing shape characteristics of a three dimension physical object. As another example, image data may be digital information representing reflectance characteristics of a substantially two dimensional physical object such as a sheet of paper.

Spatial resolution: Spatial resolution of a scanner refers to the smallest spatial region that the scanner can distinguish in relation to quantitatively sensing a characteristic corresponding to the spatial region. For example, if the scanner is configured for sensing optical reflectance of a surface of a physical object, then spatial resolution refers to the smallest area on the surface corresponding to which the scanner is capable of quantitatively sensing optical reflectance.

Temporal resolution: Temporal resolution of a scanner refers to a degree to which the scanner is responsive to detecting changes in a sensed characteristic of a physical object in time. It may be determined based on the smallest time duration below which an output of a sensor included in the scanner remains constant even if the sensed characteristic changes.

Spectral resolution: Spectral resolution of a scanner refers to the ability of the scanner to distinctly sense a property, such as intensity, related to a frequency of a wave, such as for example, light radiation. Spectral resolution may be determined as the smallest width in a frequency spectrum to which the scanner may be tuned to sense a property of the wave.

Quantization depth: Quantization depth refers to the number of digits used to represent a characteristic. It indicates the number of quantization levels available to represent different values of the characteristic. For instance, a quantization depth of 32 bits can uniquely represent $2^{35}$ number of different values of the characteristic, such as optical reflectance.

Color depth: Color depth refers to the number of digits, such as bits, used to represent color values.

Encoding format: Encoding format refers to a scheme of representing a value of the characteristic of the physical object in digital form, such as bits.

Compression type: Compression type refers to a type of compression algorithm used to compress a digital information, such that a compressed digital information occupies less storage space than the original, uncompressed digital information.

File type: File type refers to a format of storing information as a file. Examples of file types include, but are not limited to, Portable Document Format (PDF), Bitmapped (BMP), Portable Network Graphics (PNG), Joint Photographic Experts Group (JPEG), and ZIP format.

Obtaining a digital representation of one or more physical objects may be required in various situations. For example, the one or more physical objects may be a statue having historical significance. Accordingly, it may be desirable to preserve a digital copy of the statue for future use. Similarly, the one or more physical objects may be a stone with engraving of ancient scripture. Accordingly, it may be desirable to create a digital copy of the stone for studying the ancient scripture without necessarily requiring handling of the stone, which may be fragile. In another example, the one or more physical objects may be pages of a printed document, such as a book, that needs to be reproduced. Accordingly, it may be desirable to create a digital representation of the printed document and subsequently reproduce the printed document using an electronic printer. In yet another example, the one or more physical objects may be human tissue requiring physical examination. Accordingly, it may be required to create a digital representation of one or more characteristics of the human tissue to aid in the study of the human tissue. For instance, the digital representation may be displayed on a display device and analyzed by experts without necessarily requiring constant physical access to the human tissue. As another example, a digital representation of the one or more physical objects may enable computer based processing to be used for analyzing one or more characteristics of the one or more physical objects. For instance, the digital representation may be subjected to an image processing algorithm to identify regions of excessive strain on a surface of the one or more physical objects, such as a metallic artefact.

In accordance with an embodiment, a method of facilitating generation of a digital representation of one or more physical objects is disclosed. The one or more physical objects may include one or more of a naturally occurring object, a man-made object and a combination of naturally occurring object, or a man-made object. Examples of the naturally occurring object include, but are not limited to, metal, wood, clay, stone and living beings. Examples of man-made object include, but are not limited to, paper, books, fabric, plastic, alloys, semiconductor based devices and machines.

The digital representation comprises information corresponding to one or more characteristics of the one or more physical objects. The one or more characteristics may include, but are not limited to, physical characteristics, chemical characteristics and functional characteristics. For example, the one or more characteristics may be reflectance in different regions of a surface of the one or more physical objects such as a sheet of paper. As another example, the one or more characteristics may be density at different points within the one or more physical objects, such as a three dimensional plastic object. In yet another example, the one or more characteristics may be concentration of a chemical composition at different parts within the one or more physical objects, such as a liquid. In a further example, the one or more characteristics may be functional performance in different regions of the one or more physical objects such, as a two dimensional memory array.

In order to obtain the digital representation of the one or more physical objects, a scanner may be used. Additional examples of the scanner can include, but are not limited to, an optical scanner, acoustic scanner, magnetic scanner, chemical scanner, biometric scanner, Magnetic Resonance Imaging (MRI) scanner, Computed Tomography (CT) scanner and ultrasound scanner.

Figure 4:
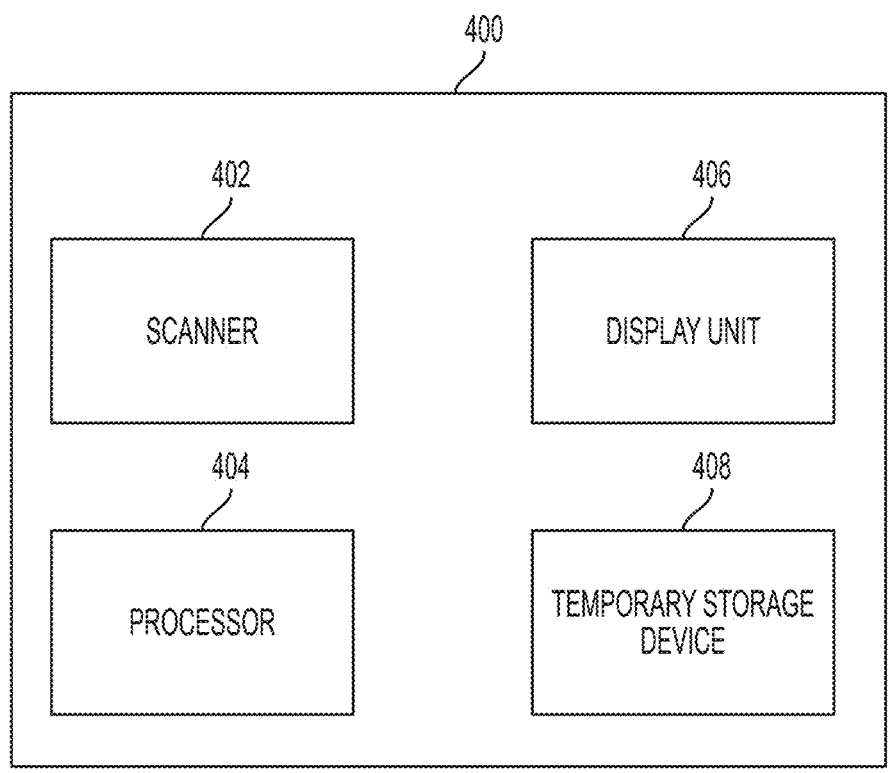
FIG. 4 is a depiction of a system for facilitating generation of digital representation of one or more physical objects in accordance with the disclosed embodiments.

FIG. 4 is a depiction of a system for facilitating generation of digital representation of one or more physical objects in accordance with the disclosed embodiments. In FIG. 4, a system 400 for facilitating generation of digital representation of the one or more physical objects in accordance with an embodiment is illustrated. In an embodiment, the system 400 may be a Multi Function Device (MFD). Further, the MFD may be configured to provide two or more functions selected from the group comprising print function, scan function, photocopy function, email function and fax function. In an embodiment, the one or more physical objects may be substantially two dimensional objects. In an embodiment, the one or more physical objects may be sheets made of a material such as, but not limited to, paper. In an embodiment, the one or more physical objects may include one or more physical documents. In another embodiment the one or more physical objects may be three-dimensional objects such as, for example, plastic figurines.

The system 400 may include a scanner 402 configured for scanning at least a first part of the one or more physical objects to obtain image data corresponding to the first part. The scanner 402 may be an instance of a scanner or device that performs a scanning function as described below in conjunction with FIG. 1 to FIG. 3. In an embodiment, the one or more physical objects may be a single physical object. Further, the first part may be a part of the single physical object. In another embodiment, the one or more physical objects may be a plurality of physical objects.

Further, the first part may include at least one physical object of the plurality of physical objects.

Further, the scanner 402 may be configured for performing the scanning based on a first set of values corresponding to one or more parameters. The image data corresponding to the first part may be a digital representation of the first part. In an embodiment, the scanner 402 may be configured for sensing the one or more optical characteristics of at least a part of the one or more physical objects. The one or more optical characteristics may include one or more of reflectance, transmittance, radiance and luminance. Further, in an embodiment, the one or more parameters may be selected from the group comprising spatial resolution, optical resolution, chrominance, spectral resolution, encoding format, compression type and file type. Accordingly, in an embodiment, the image data corresponding to the first part may represent optical information corresponding to the first part of the one or more physical objects.

The system 400 further includes a processor 404 that can be configured for determining a size of image data corresponding to the first part. The processor 404 may be an instance of a processor described in detail in conjunction with FIG. 1 to FIG. 3. The size of image data can represent an amount of storage space required to store the image data corresponding to the first part. In an embodiment, the size of the image data corresponding to the first part can depend at least on one or more values of one or more parameters of the scanner 402. In an embodiment, the processor 404 may be further configured for determining a rate at which the size is increasing.

In an embodiment, the information based on the size may include the size of the image data corresponding to the first part. In an embodiment, the information based on the size may include the indication of the size of the image data corresponding to the first part in relation to a predetermined limit. In an embodiment, the predetermined limit may be a maximum size of email attachment allowed by an email function. The email function may be, for example, a function and/or software provided by system 400. In an embodiment, the predetermined limit may be specified by a user through a display unit 406, such as a graphical user interface (GUI) of a scanner software application. Additionally, in an embodiment, the GUI 406 may be presented to the user on an Input/Output (I/O) device such as, but not limited to, the display unit 406. Further in an embodiment, the processor 404 may be further configured to execute the scanner software application. In an embodiment, an indication of the size of the image data corresponding to the first part in relation to a predetermined limit may be one or more of a qualitative indication and a quantitative indication. In an embodiment, the information based on the size may include the rate at which the size is increasing.

Additionally, the display unit 406 can be configured for displaying information based on the size of the image data corresponding to the first part, prior to receiving image data corresponding to a second part of the at least one physical object. The display unit 406 may be for example, a display panel on the MFD. In an instance, the display unit 406 may also be configured for receiving inputs from a user. For example, the display unit 406 may be a touch-screen based display device. Further, the display unit 406 may be communicatively coupled to the processor 404 through for example, but not limited to, a bus. In an embodiment, the information based on the size may be displayed in one or more of a textual form and a graphical form. Further, the display unit 406 may be configured to display the information based on the size within a Graphical User Interface (GUI) of the MFD. In an embodiment, the display unit 406 may be configured to display the information based on the size within a Graphical User Interface (GUI) of a scanner software application. The scanner software application may also be configured to control operation of the scanner 402. In an embodiment, the display unit 406 may be configured to display the information based on the size within a Graphical User Interface (GUI) of a plug-in software. Moreover, in an embodiment, the processor 404 may be further configured to execute the plug-in software. Further, the plug-in software may be configured to communicate with the scanner software application.

In an embodiment, the system 400 may include a temporary storage device 408 configured for storing the image data. Further, the temporary storage device 408 may be communicatively coupled to the processor 404 through for example, but not limited to, a bus. In an embodiment, the temporary storage device 408 may be further configured to store the image data corresponding to the first part as a single file. In an embodiment, the temporary storage device 408 may be further configured to store the image data corresponding to the first part as a plurality of files. Further, the temporary storage device 408 may be further configured for storing the image data corresponding to the first part as a single file, if the size of the image data corresponding to the first part is less than the predetermined limit. In another instance, the temporary storage device 408 may be further configured for storing the image data corresponding to the first part as a single file, if the size of the image data corresponding to the first part is equal to the predetermined limit. In an embodiment, the temporary storage device 408 may be further configured for storing the image data corresponding to the first part as a plurality of files in the temporary storage device if the size of the image data corresponding to the first part is greater than the predetermined limit. In an embodiment, the temporary storage device 408 may be further configured for automatically creating at least one file of the plurality of files.

In an embodiment, the scanner 402 may be further configured for scanning the second part of the one or more physical objects. Further, scanning the second part may be performed based on a second set of values corresponding to the one or more parameters. Moreover, a size of image data corresponding to the second part may depend at least on the second set of values. In an embodiment, the processor 404 may be further configured for processing the image data corresponding to the first part based on the second set of values of the one or more parameters. In an embodiment, the scanner 402 may be further configured for scanning the first part of the one or more physical objects based on the second set of values of the one or more parameters.

In an embodiment, display unit 406 may be further configured for displaying the quantitative indication of the first part of the one or more physical objects. The quantitative indication may represent an amount of one or more physical objects that is scanned. In an embodiment, the one or more physical objects may include a plurality of document sheets. Further, the quantitative indication of the first part may include a number of the document sheets.

The scanner 402 may include one or more sensors configured for sensing one or more characteristics of the one or more physical objects. In an embodiment, the scanner 402 may include optical sensors for sensing one or more optical characteristics of at least a part of the one or more physical objects. The one or more optical characteristics may include, but are not limited to, one or more of optical reflectance, optical transmittance, radiance and luminance. Further, the optical sensors may be configured to sense light radiation at one or more wavelengths. The one or more wavelengths may correspond to but are not limited to, microwaves, radiowaves, visible radiation, infrared radiation, ultraviolet radiation, X-rays and gamma rays. In an embodiment, the optical sensors may be multi-spectral sensors capable of sensing light at a plurality of wavelengths corresponding to visible radiation. In another embodiment, the scanner 402 may include acoustic sensors for sensing one or more acoustic characteristics of at least a part of the one or more physical objects. The one or more acoustic characteristics may be one or more of, but not limited to, acoustic reflectance, acoustic transmittance, acoustic scattering and acoustic intensity. In yet another embodiment, the scanner 402 may include chemical sensors, such as but not limited to a pH sensor, for sensing one or more chemical characteristics of at least a part of the one or more physical objects. In a further embodiment, the scanner 402 may include functional sensors configured for sensing one or more functional characteristics of the one or more physical objects. An example of a functional sensor may be a performance test equipment that is configured for determining performance characteristics of a memory cell. As other examples, the one or more sensors that may be included in the scanner 402 may be configured to sense one or more of, but not limited to, temperature, pressure, stress, strain, humidity, biometric characteristics, molecular characteristics, biological characteristics, biochemical characteristics, electrochemical characteristics, electric field, magnetic field, polarization, position, flow, viscosity, density, mass and weight.

FIG. 1 is a flowchart depicting a method of facilitating generation of digital representation of one or more physical objects in accordance with a disclosed embodiment. At step 102, image data corresponding to a first part of the one or more physical objects may be received with the processor 404. The image data corresponding to the first part may be obtained by scanning the first part of the one or more physical objects. In an instance, the first part may be a portion of a physical object of the one or more physical objects. For example, the one or more physical objects may be a substantially two dimensional object, such as a document sheet, and the first part may be a portion of the sheet. As another example, the one or more physical objects may be a three dimensional object, such as a plastic figurine, and the first part may be a portion of the surface of the plastic figurine. In another instance, the first part may be one or more physical portions of the one or more physical objects. For example, the one or more physical objects may be a set of a plurality of sheets and the first part may be one or more individual sheets. Further, the first part may be represented by a quantity. The quantity may be one or more of a relative measure and an absolute measure. As an example of relative measure, the quantity corresponding to the first part may be represented in relation to a quantity corresponding to the one or more physical objects. For instance, the quantity corresponding to the first part may be a percentage value, for example 5%, of the quantity of the one or more physical objects. Accordingly, if the quantity corresponding to the one or more physical objects such as sheets is 100 pages, then the quantity corresponding to the first part is 5 pages. Similarly, if the quantity corresponding to the one or more physical objects such as a three dimensional figurine is 100 sq·cm., then the quantity corresponding to the first part is 5 sq·cm. As an example of absolute measure, the quantity corresponding to the first part may be represented in absolute terms independent of a quantity corresponding to the one or more physical objects. For instance, the quantity corresponding to the first part may be a predetermined number of pages, such as for example, two pages. In another instance, the quantity corresponding to the first part may be represented by a predetermined time duration, such as for example, one minute, during which scanning of the one or more physical objects is performed. In an embodiment, the quantity corresponding to the first part may be specified by a user through the GUI of the display unit 406.

The scanning of at least the first part of the one or more physical objects may be performed based on a first set of values corresponding to one or more parameters. In an embodiment, the first set of values may be received from a user through the GUI of the scanner software application. In another embodiment, the first set of values may be pre-stored in the scanner as default values. The one or more parameters may control the scanning. In general, the one or more parameters may determine a quality of the digital representation of the one or more physical objects. For instance, the one or more parameters may be one or more of, but not limited to, a spatial resolution, a temporal resolution, one or more characteristics of the one or more physical objects to be scanned, a Portion Of Interest (POI) of the one or more physical objects to be scanned, quantization depth, encoding format, a compression type and output file type. In an embodiment, the one or more parameters may correspond to an optical scanner. Accordingly, the one or more parameters may include one or more of spatial resolution, chrominance, color depth, spectral resolution, encoding format, compression type and output file type.

During and/or after scanning at least the first part of the one or more physical objects, image data corresponding to the first part may be obtained. The image data corresponding to the first part may be a digital representation of the first part. More specifically, the image data corresponding to the first part may be a digital representation of one or more characteristics of the first part. A characteristic of the one or more characteristics may be sensed by a sensor of the one or more sensors included in the scanner 402. Accordingly, a sensed value corresponding to a portion of the first part may be generated by the sensor. The sensed value may be a signal representing the characteristic corresponding to the portion of the first part. In an embodiment, the signal may be an analogue signal. Subsequently, the sensed value may be converted to digital form by using a digital encoder or other analogue-to-digital encoding software or function of the processor 404. In an alternative embodiment, the sensed value may be converted to digital form by using a digital encoder included in the system 400 as a separate hardware device or software function. As a result, an output of the digital encoder may include digital information such as, but not limited to, binary digits that represent the characteristic of the portion of the first part. In an instance, the image data may be the output of the digital encoder. In another instance, the image data may be a processed form of the output of the digital encoder. The processed form of the output may be obtained by subjecting the output of the digital encoder to one or more computing processes such as, but not limited to, compression, encoding and transformation. As an example, the one or more physical objects may be a sheet of paper containing printed text. Further, the sheet of paper may be scanned by the scanner 402, such as an optical scanner. The optical scanner may, for instance, direct an incident beam of light of predetermined intensity onto the portion of the first part of the sheet of paper. An area of the portion may be based on a spatial resolution of the optical scanner. Further, an optical sensor included in the optical scanner may be configured to receive a reflected beam of light from the portion of the first part. Further, the optical sensor may be configured to generate an electronic signal representing an intensity of the reflected beam. The electronic signal may then be converted into a series of bits by using a digital encoder. As a result, the series of bits represents a reflectance characteristic of the portion of the first part of the sheet of paper. Thus, in an instance, the series of bits may be an example of the image data corresponding to the first part.

Subsequent to scanning at least the first part of the one or more physical objects, at step 104, a size of image data corresponding to the first part may be determined. The size represents an amount of storage space required to store the image data corresponding to the first part. In general, the size of the image data corresponding to the first part may depend on the first set of values corresponding to the one or more parameters. For instance, a higher value corresponding to spatial resolution of the scanner 402 may generate image data of bigger size as compared to that corresponding to a lower value of spatial resolution. In another instance, scanning chrominance characteristics of the first part of the one or more physical objects may generate image data of bigger size in comparison to scanning luminance characteristics of the first part of the one or more physical objects.

Further, the size of the image data corresponding to the first part may also depend on an information entropy level of the one or more characteristics corresponding to the first part. For instance, an information entropy level corresponding to the shape of a three dimensional sphere may be lesser than the information entropy level corresponding to the shape of a three dimensional figurine. Accordingly, a size of image data corresponding to the first part of the three dimensional figurine may be greater than a size of image data corresponding to the first part of the three dimensional figurine. Similarly, an information entropy level corresponding to reflectance characteristic of a sheet of paper consisting of printed text may be lesser than an information entropy level corresponding to reflectance characteristic of a sheet of paper consisting of printed pictures. In the example, when the first set of values corresponding to the one or more parameters are maintained as constant, the size of the image data corresponding to the first part of a sheet of paper, consisting of printed pictures, may be greater than the size of the image data corresponding to the first part of a sheet of paper, consisting of printed text.

In an embodiment, the size of the image data corresponding to the first part may be determined by counting a number of bytes generated by the digital encoder included in the scanner 402. In another embodiment, the size of the image data corresponding to the first part may be determined by counting a number of storage locations in the temporary storage device 408 used to store the image data corresponding to the first part. Accordingly, the image data corresponding to the first part may be stored in the temporary storage device 408 included in the system 400. The temporary storage device 408 may include for example, but not limited to, a Static Random Access Memory (SRAM), Dynamic Random Access Memory (DRAM), flash memory, magnetic media based storage and optical media based storage. Further, the temporary storage device 408 may include a plurality of storage locations. Each storage location of the plurality of storage locations may be configured to store a fixed number of bits, such as for example, 64 bits. Accordingly, the size of the image data corresponding to the first part may be determined by counting a number of storage locations in the temporary storage device 408 occupied by the image data corresponding to the first part.

Thereafter, at step 106, information based on the size of the image data corresponding to the first part may be displayed. In an embodiment, the information based on the size of the image data corresponding to the first part may be displayed prior to receiving image data corresponding to a second part of the one or more physical objects. In other words, the information based on the size of the image data corresponding to the first part may be displayed while a second part of the one or more physical objects is yet to be scanned or is in the process of being scanned. For example, the one or more physical objects may be 100 sheets of paper while the first part of the one or more physical objects may be 10 sheets of paper. Accordingly, subsequent to scanning 10 sheets of paper, a size of image data corresponding to 10 sheets of paper may be displayed on the display unit 406, while remaining 90 sheets of paper are not yet scanned or are in the process of being scanned. In an instance, subsequent to determining the size of the image data corresponding to the first part, the scanner 402 may be prevented from performing further scanning of the one or more physical objects. Thereafter, the information based on the size of the image data corresponding to the first part may be displayed. In another embodiment, the information based on the size of the image data corresponding to the first part may be displayed while scanning a second part of the one or more physical objects is in progress. For example, subsequent to scanning 10 sheets of paper, a size of image data corresponding to 10 sheets of paper may be displayed while scanning of at least a portion of the remaining 90 sheets of paper is in progress.

In an embodiment, the information based on the size of the image data corresponding to the first part may be displayed on the display unit 406 within a Graphical User Interface (GUI) of a scanner software application corresponding to the scanner 402. The scanner software application may be configured to control operation of the scanner 402. For example, the GUI of the scanner software application may enable a user to provide the first set of values corresponding to the one or more parameters of the scanner 402. Accordingly, the scanner 402 may perform the scanning based on the first set of values corresponding to the one or more parameters. In an instance, the scanner software application may be configured to execute on a processor included in the scanner. In another embodiment, the scanner software application may be configured to execute on the processor 404 included in the system 400 or a remote processor physically separated from, but communicatively connected to, the system 400. In an embodiment, the GUI may be displayed on the display unit 406 of the system 400. In another embodiment, the GUI may be displayed on a display unit of another electronic device such as, but not limited to, a desktop computer communicatively coupled to the scanner 402.

In another embodiment, the information based on the size of the image data corresponding to the first part may be displayed within a GUI of a plug-in software. Further, the plug-in software may be configured to execute on the processor 404. In another instance, the plug-in software may be configured to execute on a processor of another electronic device such as but not limited to, a desktop computer, a laptop computer and a portable computer. Further, the plug-in software may be configured to communicate with the scanner software application. In yet another embodiment, the information based on the size may be displayed within a GUI of a Multi Function Device (MFD). The MFD may be configured to provide two or more functions selected from the group comprising print function, scan function, photocopy function, email function and fax function.

Figure 2:
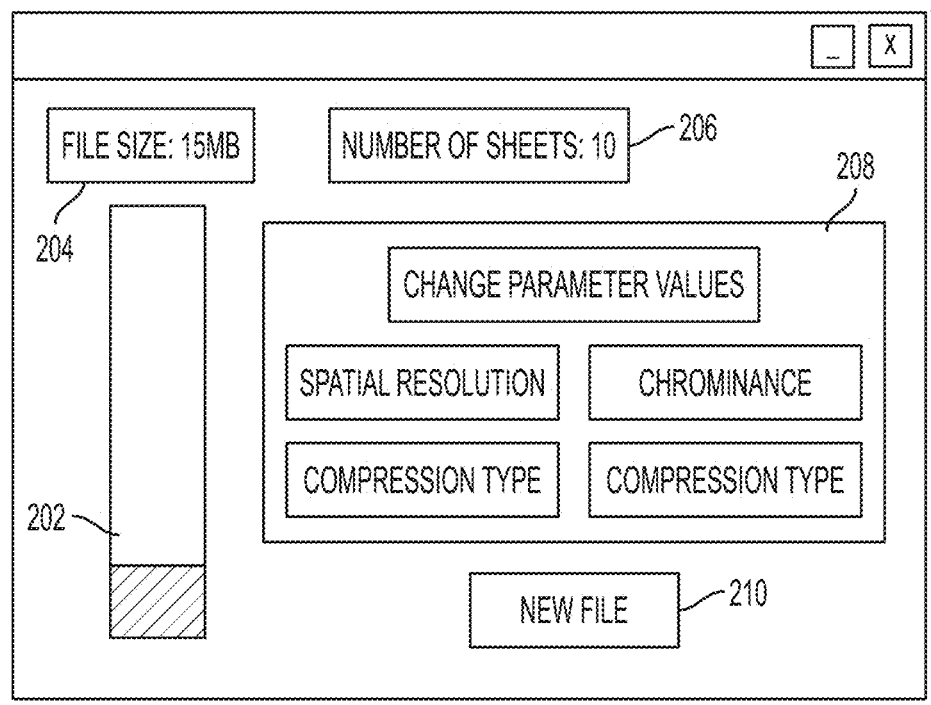
FIG. 2 is a depiction of a Graphical User Interface (GUI) of a scanner software application in accordance with the disclosed embodiments of FIG. 1.

FIG. 2 is a depiction of a Graphical User Interface (GUI) of a scanner software application in accordance with the disclosed embodiments of FIG. 1. The GUI depicted in FIG. 2 may be displayed on the display unit 406. In an embodiment, the information based on the size of the image data corresponding to the first part may include the size of the image data corresponding to the first part. For example, the one or more physical objects may be 100 sheets of paper while the first part of the one or more physical objects may be 10 sheets of paper. Accordingly, the size of the image data corresponding to the 10 sheets of paper, such as for example, 15 Mega Bytes (MB) may be displayed. Further, in an embodiment, the information based on the size of the image data corresponding to the first part may include an indication of the size of the image data corresponding to the first part in relation to a predetermined limit. Further, the indication may be one or more of a qualitative indication and a quantitative indication. An example of the qualitative indication may be a warning message such as "File size may exceed maximum limit". An example of the quantitative display may be a shaded part of a rectangular bar, such as a rectangular bar 202 as illustrated in FIG. 2. A length of the rectangular bar 202 may represent the predetermined limit. Further, a length of the shaded part of the rectangular bar 202 may represent the size of the image data corresponding to the first part. In an embodiment, the predetermined limit may be specified by a user. In another embodiment, the predetermined limit may be automatically determined based on a maximum size of email attachment allowed by an email function of the scanner 402. In an embodiment, the email function may be an integral function provided by the scanner 402 such as an MFD. In another embodiment, the predetermined limit may be automatically determined based on a recipient of a file comprising the digital representation of the one or more physical objects. For example, a user may enter an email address corresponding to the recipient into the GUI of the scanner 402. Accordingly, the maximum size of email attachment allowed by an email service provider of the recipient may be automatically determined. Subsequently, the predetermined limit may be automatically determined based on the maximum size. In another embodiment, the information based on the size of the image data corresponding to the first part may include a rate at which the size is increasing. For example, a rate of 1.5 MB/sheet may be determined and displayed.

In yet another embodiment, a quantitative indication of the first part of the one or more physical objects may be further displayed. The quantitative indication may represent an amount of the one or more physical objects that has been scanned. For example, the quantitative indication may be "10 sheets" as exemplarily illustrated in FIG. 2 as GUI element 206. In another embodiment, the quantitative indication of the first part of the one or more physical objects may be in relation to the one or more physical objects. For example, the quantitative indication may be expressed as a percentage value, such as 10% of the one or more physical objects. As a result, a user is provided with knowledge of a relationship between an amount of the one or more physical objects already scanned and the size of the image data corresponding to the amount.

In an embodiment, the information based on the size of the image data corresponding to the first part may be displayed in one or more of a textual form and a graphical form. For example, as shown in FIG. 2, information based on the size may be displayed graphically in the form of the rectangular bar 202. In another example, as shown in FIG. 2, information based on the size may be displayed in textual form such as the GUI element 204, including numerical information. More generally, in other embodiments, the information based on the size of the image data corresponding to the first part may be presented to a user in any other form. For instance, the information based on the size of the image data corresponding to the first part may be presented as one or more of, a strobe light, a buzzer sound, an audio message and a tactile output such as Braille.

In yet another embodiment, subsequent to determining the size of the image data corresponding to the first part of the one or more physical objects, a total size of image data corresponding to the one or more physical objects may be predicted. The total size of image data may be predicted based on each of the size of the image data corresponding to the first part and a quantity corresponding to the one or more physical objects that is yet to be scanned. For example, the quantity corresponding to the one or more physical objects, such as sheets, may be a number of sheets. Accordingly, in an instance, if the one or more physical objects include 100 sheets of paper and the first part of the one or more physical objects includes 10 sheets, the quantity of '90' corresponding to the remaining sheets may be determined. In an embodiment, one or more sensors included in the scanner may be used to determine the quantity. For example, an optical sensor located in a feed-tray of the scanner 402 may optically sense a width of stacked sheets and accordingly estimate the quantity based on a predetermined width of each sheet. Subsequent to determining the quantity, a size of image data corresponding to the quantity of the one or more physical objects yet to be scanned may be estimated based on the size of image data corresponding to the first part. For example, if the size of 10 sheets is determined to be 15 MB, then the size of the 90 sheets yet to be scanned may be estimated as 90×(15/10), i.e., 135 MB. Accordingly, the total size of image data corresponding to the 100 sheets may be estimated as 150 MB and subsequently displayed to the user.

Figure 3:
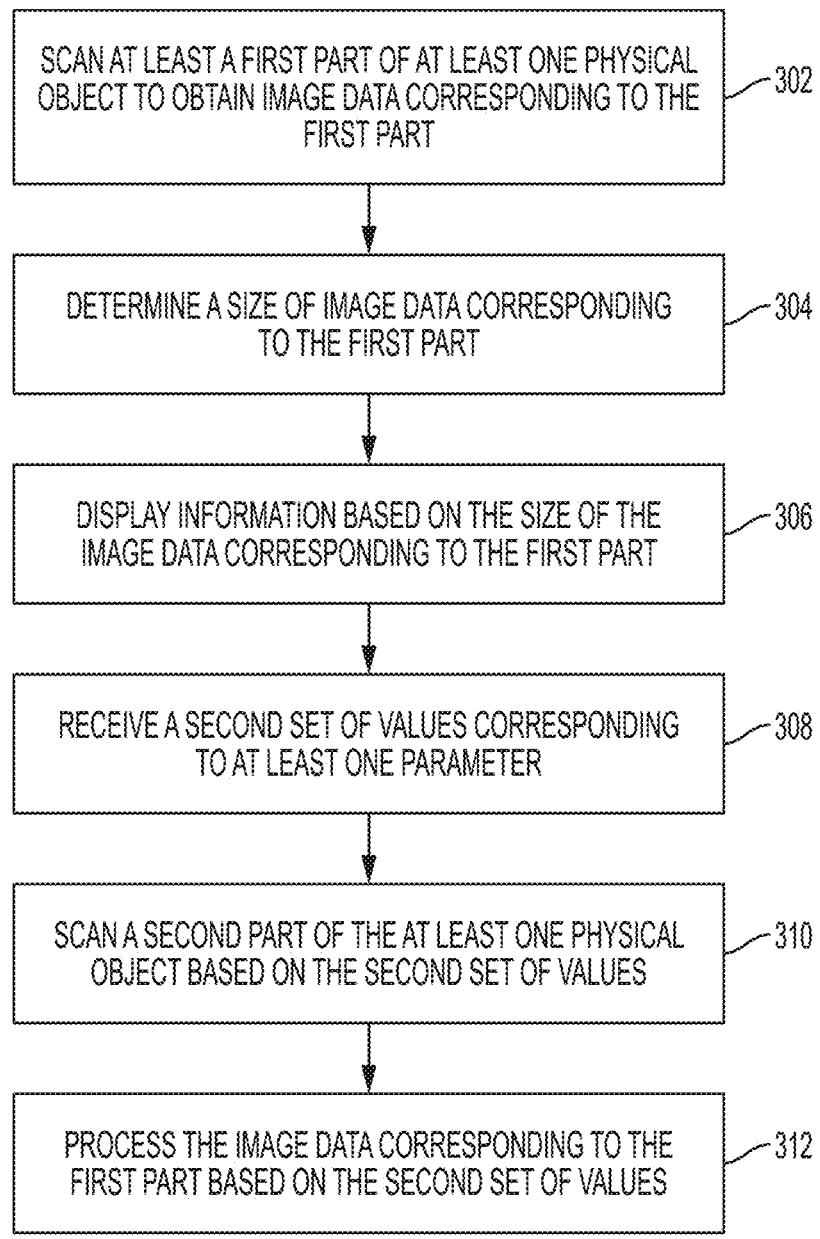
FIG. 3 is a flowchart depicting a method of facilitating generation of digital representation of one or more physical objects in accordance with another disclosed embodiment.

FIG. 3 is a flowchart depicting a method of facilitating generation of digital representation of one or more physical objects in accordance with another disclosed embodiment. In FIG. 3, a method for facilitating scanning of the one or more physical objects in accordance with another embodiment is illustrated. At step 302, at least the first part of the one or more physical objects may be scanned to obtain image data corresponding to the first part. The image data corresponding to the first part may be a digital representation of the first part. Further, the scanning may be performed based on the first set of values corresponding to one or more parameters. In an embodiment, the first set of values may be received from a user through the GUI 208 of the scanner software application. In another embodiment, the first set of values may be pre-stored in the scanner as default values. Subsequently, at step 304, a size of image data corresponding to the first part may be determined. The size may represent an amount of storage space required to store the image data corresponding to the first part. Thereafter at step 306, information based on the size of the image data corresponding to the first part may be displayed while the second part of the at least one physical object is yet to be scanned. Further details regarding steps 302, 304 and 306 are explained in conjunction with corresponding steps 102, 104 and 106 of FIG. 1.

Subsequent to displaying information based on the size of the image data corresponding to the first part, a user may desire to alter the first set of values corresponding to the one or more parameters. For example, after knowing the size of the image data corresponding to the first part, the user may infer that the total size of the digital representation of the one or more physical objects may exceed a predetermined limit. Therefore, the user may desire to change the first set of values corresponding to the one or more parameters to ensure that the total size of the digital representation is lower than or equal to the predetermined limit. As another example, after knowing the size of the image data corresponding to the first part, the user may infer that the total size of the digital representation may be lower than the predetermined limit. Therefore, the user may desire to change the first set of values corresponding to the one or more parameters to ensure that a higher quality of the digital representation is achieved.

Accordingly, at step 308, a second set of values corresponding to the one or more parameters may be received. In an embodiment, the second set of values may be received through the GUI of the scanner software application such as the GUI elements 208 as illustrated in FIG. 2. For example, upon inferring that the total size of the digital representation of the one or more physical objects may exceed a predetermined limit, the user may provide a second value of spatial resolution that is lesser than a first value of spatial resolution in the first set of values. As another example, upon inferring that the total size of the digital representation of the one or more physical objects may be less than a predetermined limit, the user may provide a second value of spatial resolution that is greater than the first value of spatial resolution in the first set of values.

Thereafter at step 310, the second part of the one or more physical objects may be scanned based on the second set of values. In an instance, a size of image data corresponding to the second part may depend on the second set of values.

Further, in an embodiment, at step 312, the image data corresponding to the first part of the one or more physical objects may be processed based on the second set of values. Accordingly, the image data corresponding to the first part may be accessed from the temporary storage device 408. Subsequently, the image data corresponding to the first part may be processed to obtain processed image data. For instance, the image data corresponding to the first part may be processed using one or more algorithms. Accordingly, in one embodiment, the processor 404 included in the scanner may be configured to execute a program code based on the one or more algorithms. An example of the one or more algorithms may be a low pass spatial filtering algorithm. Accordingly, high spatial frequencies contained in the image data corresponding to the first part may be eliminated. As a result, a size of the processed image data corresponding to the first part may be lower than the size of the image data corresponding to the first part. Consequently, image data corresponding to each of the first part and the second part of the one or more physical objects may be based on same set of values corresponding to the one or more parameters. However, in another embodiment, the image data corresponding to the first part of the one or more physical objects may not be processed based on the second set of values. Consequently, image data corresponding to the first part and image data corresponding to the second part of the one or more physical objects may be based on different set of values corresponding to the one or more parameters.

In another embodiment, based on the second set of values received from the user, a need may be determined for performing scanning of the first part of the one or more physical objects based on the second set of values. For example, if a chrominance value in the first set of values was '0' while a chrominance value in the second set of values is '1', it may be determined that that the first part of the one or more physical objects needs to be scanned based on the second set of values. This is because with a chrominance value of '0', the scanner 402 may not have sensed chrominance information corresponding to the first part of the one or more physical objects. In an embodiment, the user may be prompted for providing an approval to perform scanning of the first part based on the second set of values. Accordingly, upon receiving the approval, the first part may be scanned based on the second set of values.

In an embodiment, each of the image data corresponding to the first part and the image data corresponding to the second part may be stored in one or more files. A format of the one or more files may be specified by a user. Alternatively, in an embodiment, a default format may be used. In a particular embodiment, each of the image data corresponding to the first part and the image data corresponding to the second part may be stored in a single file. In an embodiment, the image data corresponding to the first part may be stored in a single file. In another embodiment, the image data corresponding to the first part may be stored in a plurality of files. In a further embodiment, the image data corresponding to the first part may be stored in a plurality of files when the size of the image data corresponding to the first part is greater than the predetermined limit. Moreover, in an embodiment, at least one file of the plurality of files may be automatically created. In another embodiment, the user may be provided with an option to manually create at least one file of the plurality of files. For instance, the GUI element 210 as illustrated in FIG. 2 may allow the user to manually create at least one file of the plurality of files.

In accordance with an exemplary embodiment of the method disclosed herein, the one or more physical objects may be one or more sheets of paper. The one or more sheets of paper may contain printed content such as text and pictures. In order to create a digital representation of the one or more sheets of paper, the scanner 402 such as an optical scanner may be used. The optical scanner may be controlled based on the one or more parameters. The one or more parameters may be for example, spatial resolution expressed in dots per inch, chrominance value, compression type and output file type. The chrominance value determines whether the optical scanner senses chrominance information in the one or more sheets of paper during scanning. A chrominance value of '0' implies that the scanning determines only luminance information. Further, a chrominance value of '1' implies that the scanning determines chrominance information. Initially, the first set of values corresponding to the one or more values may be received from a user. For example, the user may provide the chrominance value to '1' and a spatial resolution value of "Maximum". Subsequently, the first part of the one or more sheets of paper, such as the first 5 pages, may be scanned based on the first set of values. Further, the size of the image data corresponding to the first 5 pages may be determined. Thereafter, the size of the image data corresponding to the first 5 pages may be displayed on the GUI element 202, along with an indication of the number of pages comprised in the first part. Accordingly, the size and the number of pages may be displayed in textual form in the GUI element 204 such as "5 Pages-10 MB" while scanning of the one or more sheets of paper is still in progress. For example, if the one or more sheets of paper include 100 sheets of paper, then the size of the image data corresponding to the first 5 pages may be displayed while scanning of at least a portion of the remaining 95 pages is in progress. Based on the knowledge of the size of the image data corresponding to the first 5 pages, the user may realize that a total size of digital representation of the 100 sheets of paper may exceed a predetermined limit. The predetermined limit may be a maximum size of an email attachment allowed by an email function of the system 400. Consequently, the user may provide the second set of values corresponding to the one or more parameters. More specifically, the user may provide a chrominance value of '0' and a spatial resolution value of "Maximum". Subsequently, the remaining sheets of paper that are yet to be scanned may be subjected to scanning based on the second set of values. Moreover, the image data corresponding to the sheets of paper already scanned may be processed based on the second set of values. As a result, a total size of the digital representation of the 100 sheets of paper may be equal to or less than the predetermined limit.

Figure 5:
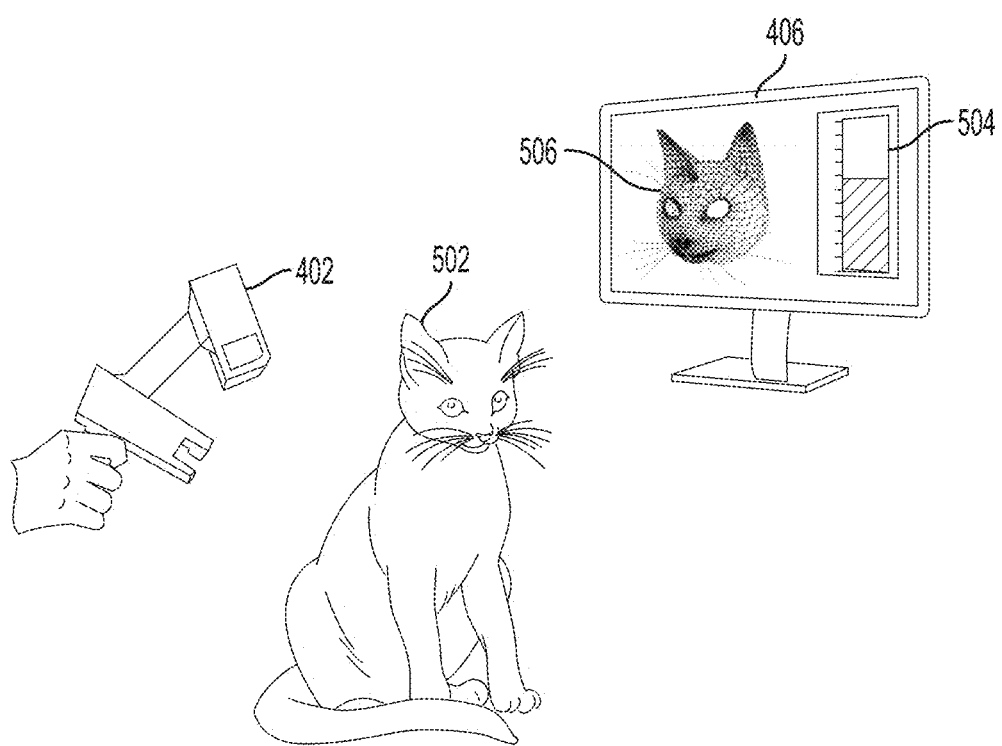
FIG. 5 is a depiction of a Graphical User Interface (GUI) of a 3D scanner software application in accordance with the disclosed embodiments of FIG. 1.

FIG. 5 is a depiction of a Graphical User Interface (GUI) of a 3D scanner software application in accordance with the disclosed embodiments of FIG. 1. As illustrated, the scanner 402 may be a handheld 3D scanner used for scanning shape of a physical object 502 shown as a toy cat. The physical object 502 may be an instance of the one or more physical objects described above. Initially, the user may have selected the first set of values corresponding to the one or more parameters of the scanner 402. For example, the user may have selected a value of "Maximum" corresponding to spatial resolution parameter of the scanner 402. Accordingly, as the user begins scanning a first part of the physical object 502, image data corresponding to the first part may be received by the processor 404. The first part of the physical object 502 may be an instance of the first part of the one or more physical objects described above. As depicted, the first part of the physical object 502 may be the head portion of the toy cat. Subsequently, the processor 404 may determine a size of the image data corresponding to the first part of the physical object 502. Thereafter, information based on the size may be displayed on the display device 406 prior to receiving image data corresponding to a second part of the physical object 502. The second part of the physical object may be an instance of the second part of the one or more physical objects as described above. As an example, the second part of the physical object 502 may be the body portion of the toy cat which is not yet scanned by the user. In an instance, the information based on size may be the size of the image data corresponding to the first part of the physical object 502. As illustrated exemplarily, the size may be displayed in graphical form such as a rectangular bar 504. The length of a shaded part of the rectangular bar 504 may represent the size of the image data corresponding to the first part. Further, the size may be displayed in relation to a predetermined limit. Accordingly, the total length of the rectangular bar 504 may represent the predetermined limit. In some embodiments, the display device 406 may also display a visual representation 506 of the image data corresponding to the first part as shown. As illustrated, the size of the image data may be more than 50% of the predetermined limit due to the "Maximum" value of spatial resolution being selected. As a result, the user may infer that the image data corresponding to the entire physical object 502 may exceed the predetermined limit. Accordingly, the user may then select a second set of values corresponding to the one or more parameters of the scanner 402. For example, the user may select a value of "Medium" for the spatial resolution parameter of the scanner 402. Subsequently, the user may perform scanning of the second part of the physical object 502 based on the second set of values. Further, the processor 404 may process the image data corresponding to the first part based on the second set of values. The processing of the image data may be such that a size of the image data corresponding to the first part may be reduced. For example, the processing may include down-sampling of the image data corresponding to the first part. As a result, a total size of image data corresponding to the physical object 502 may be within the predetermined limit.

Figure 6:
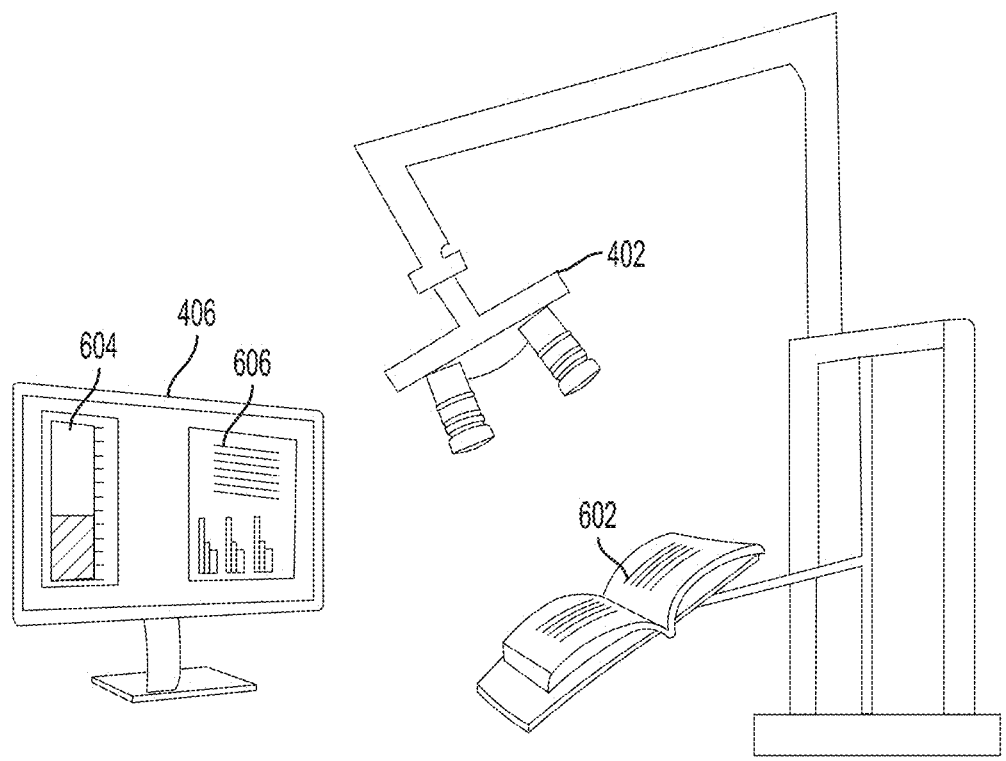
FIG. 6 is a depiction of a Graphical User Interface (GUI) of a 2D scanner software application in accordance with the disclosed embodiments of FIG.

FIG. 6 is a depiction of a Graphical User Interface (GUI) of a 2D scanner software application in accordance with the disclosed embodiments of FIG. 1. As illustrated, the scanner 402 may be a table-mount 2D scanner used for scanning a physical object 602 shown as pages of a book. The physical object 602 may be an instance of the one or more physical objects described above. Initially, the user may have selected the first set of values corresponding to the one or more parameters of the scanner 402. For example, the user may have selected a value of '1' corresponding to chrominance parameter of the scanner 402. Accordingly, the scanner 402 may capture color information from the pages of the book. As the user begins scanning a first part of the physical object 602, image data corresponding to the first part may be received by the processor 404. The first part of the physical object 602 may be an instance of the first part of the one or more physical objects described above. As depicted, the first part of the physical object 602 may be the first 10 pages of the book containing 100 pages. Subsequently, the processor 404 may determine a size of the image data corresponding to the first part of the physical object 602. Thereafter, information based on the size may be displayed on the display device 406 prior to receiving image data corresponding to a second part of the physical object 602. The second part of the physical object may be an instance of the second part of the one or more physical objects as described above. As an example, the second part of the physical object 602 may be the remaining 90 pages of the book which are not yet scanned by the scanner 402. In an instance, the information based on size may be the size of the image data corresponding to the first part of the physical object 602. As illustrated exemplarily, the size may be displayed in graphical form such as a rectangular bar 604. The length of a shaded part of the rectangular bar 604 may represent the size of the image data corresponding to the first part. Further, the size may be displayed in relation to a predetermined limit. Accordingly, the total length of the rectangular bar 604 may represent the predetermined limit. In some embodiments, the display device 406 may also display a visual representation 606 of the image data corresponding to at least a portion of the first part as shown. As illustrated, the size of the image data may be more than 25% of the predetermined limit due to value "1" being selected for the chrominance parameter. As a result, the user may infer that the image data corresponding to the entire physical object 602 may exceed the predetermined limit since only 10% of the physical object 602 has been scanned. Accordingly, the user may then select a second set of values corresponding to the one or more parameters of the scanner 402. For example, the user may select a value of "0" for the chrominance parameter of the scanner 402. Accordingly, the scanner 402 may capture only gray-scale information from the pages of the book. Subsequently, the user may perform scanning of the second part of the physical object 602 based on the second set of values. Further, the processor 404 may process the image data corresponding to the first part based on the second set of values. The processing of the image data may be such that a size of the image data corresponding to the first part may be reduced. The processing may be for instance conversion of color images into gray-scale images. As a result, a total size of image data corresponding to the physical object 602 may be within the predetermined limit.

It will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method of facilitating generation of a digital representation of at least one physical object, the computer implemented method comprising:
    scanning, by a scanner, a first part of the at least one physical object to obtain image data corresponding to the first part of the at least one physical object, wherein the scanning of the first part is performed based on a first set of values for a set of parameters that control the scanning, wherein the image data corresponding to the first part is a digital representation of the first part;
    determining, with a processor, a size of the image data corresponding to the first part, wherein the size represents an amount of storage space required to store the image data corresponding to the first part;
    before scanning a second part of the at least one physical object, displaying information, to a user on a graphical user interface, indicating at least one of the size of the image data corresponding to the first part, and an estimate of a total size of image data corresponding to the at least one physical object based on the size of the image data corresponding to the first part;
    receiving, from the user, a second set of values for the set of parameters that control the scanning; and
    after displaying the information to the user and receiving the second set of values from the user, scanning, by the scanner, the second part of the at least one physical object to obtain image data corresponding to the second part of the at least one physical object,
    wherein scanning of the second part is performed based on the second set of values for the set of parameters, wherein the value of at least one of the parameters in the second set is different than in the first set, and a size of the image data corresponding to the second part depends on at least the value of the at least one parameter that is different in the second set, the size represents an amount of storage space required to store the image data corresponding to the second part, and the first and second parts are different portions of the at least one physical object, with the first part being one portion of the at least one physical object and the second part being a remaining portion of the at least one physical object.

2. The computer implemented method of claim 1, wherein the at least one physical object is a plurality of sheets.

3. The computer implemented method of claim 1, wherein scanning the first part comprises sensing at least one optical characteristic of a part of the at least one physical object, wherein the at least one optical characteristic comprises at least one of reflectance, transmittance, radiance and luminance.

4. The computer implemented method of claim 1, wherein the image data corresponding to the first part is stored as a single file in a temporary storage device.

5. The computer implemented method of claim 1, wherein the scanner is a Multi Function Device (MFD), wherein the MFD is configured to provide at least two functions selected from the group comprising: print function, scan function, photocopy function, email function and fax function.

6. The computer implemented method of claim 1, wherein the information is displayed within a Graphical User Interface (GUI) of a software application executed on the processor, wherein the software application is configured to control at least one operation of the scanner.

7. The computer implemented method of claim 1, further comprising processing, by the processor, the image data corresponding to the first part based on the second set of values for the set of parameters so as to change the size of the image data corresponding to the first part.

8. The computer implemented method of claim 7, wherein the image data corresponding to the first and second parts is stored as a single file in a temporary storage device.

9. The computer implemented method of claim 1, further comprising scanning the first part of the at least one physical object based on the second set of values for the set of parameters.

10. The computer implemented method of claim 1, wherein the information indicating the size of the image data corresponding to the first part is displayed, wherein the information indicating the size comprises an indication of the size of the image data corresponding to the first part in relation to a predetermined limit.

11. The computer implemented method of claim 10, wherein the predetermined limit is a maximum size of email attachment allowed by an email function.

12. The computer implemented method of claim 10, wherein the predetermined limit is specified by a user.

13. The computer implemented method of claim 1 further comprising displaying a quantitative indication of the first part of the at least one physical object, wherein the quantitative indication represents an amount of the at least one physical object scanned.

14. The computer implemented method of claim 13, wherein the at least one physical object comprises a plurality of sheets, wherein the quantitative indication of the first part comprises a number of sheets.

15. The computer implemented method of claim 1 further comprising storing the image data corresponding to the first part as a single file, wherein the size of the image data corresponding to the first part is at least one of less than and equal to a predetermined limit.

16. The computer implemented method of claim 1 further comprising:
    determining a quantity corresponding to the second part of the at least one physical object;
    estimating a size of image data corresponding to the second part based on each of the size of image data corresponding to the first part and the quantity corresponding to the second part; and
    estimating the total size of image data corresponding to the at least one physical object based on each of the size of image data corresponding to the first part and the size of image data corresponding to the second part.

17. The computer implemented method of claim 16 wherein the total size of image data corresponding to the at least one physical object is displayed.

18. The computer implemented method of claim 1 further comprising:
    presenting, with a processor, a user interface to enable a user to create at least one file of a plurality of files; and
    storing the image data corresponding to the first part as the plurality of files, wherein the size of the image data corresponding to the first part is greater than a predetermined limit.

19. The computer implemented method of claim 1, further comprising processing, by the processor, the image data corresponding to the first part based on the second set of values for the set of parameters so as to reduce the size of the image data corresponding to the first part.

20. A system for facilitating generation of a digital representation of at least one physical object, the system comprising:
a scanner configured for scanning a first part of the at least one physical object to obtain image data corresponding to the first part of the at least one physical object, wherein the scanning of the first part is performed based on a first set of values for a set of parameters that control the scanning, wherein the image data corresponding to the first part is a digital representation of the first part;
a processor configured for determining a size of image data corresponding to the first part, wherein the size represents an amount of storage space required to store the image data corresponding to the first part;
a display unit configured for displaying, before scanning a second part of the at least one physical object, information to a user indicating at least one of the size of the image data corresponding to the first part, and an estimate of a total size of image data corresponding to the at least one physical object based on the size of the image data corresponding to the first part, wherein the display unit is communicatively coupled to the processor; and
an interface for receiving, from the user, a second set of values for the set of parameters that control the scanning,
wherein the scanner is further configured for, after the second set of values is received from the user, scanning the second part of the at least one physical object to obtain image data corresponding to the second part of the at least one physical object, wherein scanning of the second part is performed based on the second set of values for the set of parameters,
the value of at least one of the parameters in the second set is different than in the first set, and a size of the image data corresponding to the second part depends on at least the value of the at least one parameter that is different in the second set, the size represents an amount of storage space required to store the image data corresponding to the second part, and
the first and second parts are different portions of the at least one physical object, with the first part being one portion of the at least one physical object and the second part being a remaining portion of the at least one physical object.

21. The system of claim 20, wherein the at least one physical object is a plurality of sheets.

22. The system of claim 20, wherein the scanner is configured for sensing at least one optical characteristic of at least a part of the at least one physical object, wherein the at least one optical characteristic comprises at least one of reflectance, transmittance, radiance and luminance.

23. The system of claim 20 further comprising a temporary storage device configured for storing the image data corresponding to the first part as a single file.

24. The system of claim 23, wherein the size of the image data corresponding to the first part is at least one of less than and equal to a predetermined limit.

25. The system of claim 20, wherein the scanner is a Multi Function Device (MFD), wherein the MFD is configured to provide at least two functions selected from the group comprising print function, scan function, photocopy function, email function and fax function.

26. The system of claim 20, wherein the information is displayed within a Graphical User Interface (GUI) of a scanner software application, wherein the scanner software application is configured to control operation of the scanner.

27. The system of claim 20, wherein the processor is further configured for processing the image data corresponding to the first part based on the second set of values for the set of parameters so as to change the size of the image data corresponding to the first part.

28. The system of claim 27, further comprising a temporary storage device, wherein the image data corresponding to the first and second parts is stored as a single file in the temporary storage device.

29. The system of claim 20, wherein the scanner is further configured for scanning the first part of the at least one physical object based on the second set of values for the set of parameters.

30. The system of claim 20, wherein the information indicating the size of the image data corresponding to the first part is displayed, wherein the information indicating the size comprises an indication of the size of the image data corresponding to the first part in relation to a predetermined limit.

31. The system of claim 30, wherein the predetermined limit is a maximum size of email attachment allowed by an email function.

32. The system of claim 30, wherein the predetermined limit is specified by a user.

33. The system of claim 20, wherein the display unit is further configured for displaying a quantitative indication of the first part of the at least one physical object, wherein the quantitative indication represents an amount of the at least one physical object scanned.

34. The system of claim 33, wherein the at least one physical object comprises a plurality of sheets, wherein the quantitative indication of the first part comprises a number of sheets.

35. The system of claim 20, wherein the processor is further configured for:
determining a quantity corresponding to the second part of the at least one physical object;
estimating a size of image data corresponding to the second part based on each of the size of image data corresponding to the first part and the quantity corresponding to the second part; and
estimating the total size of image data corresponding to the at least one physical object based on each of the size of image data corresponding to the first part and the size of image data corresponding to the second part.

36. The system of claim 35, wherein the display unit displays the total size of image data corresponding to the at least one physical object.

37. The system of claim 20, wherein the processor is further configured for presenting a user interface to enable a user to create at least one file of a plurality of files, wherein a storage device is configured for storing the image data corresponding to the first part as the plurality of files, wherein the size of the image data corresponding to the first part is greater than a predetermined limit.

38. The system of claim 20, wherein the processor is further configured for processing the image data corresponding to the first part based on the second set of values for the set of parameters so as to reduce the size of the image data corresponding to the first part.

* * * * *